(12) United States Patent
Bremer et al.

(10) Patent No.: US 11,444,673 B2
(45) Date of Patent: Sep. 13, 2022

(54) ANTENNA SYSTEM WITH MULTIPLE TRANSMIT PATHS

(71) Applicant: Motorola Mobility LLC, Chicago, IL (US)

(72) Inventors: Brian Hans Bremer, Arlington Heights, IL (US); Armin W. Klomsdorf, Chicago, IL (US); John Peter Vitale, Chicago, IL (US); Junsheng Zhao, Vernon Hills, IL (US); Mohammed Rajeek Abdul-Gaffoor, Palatine, IL (US)

(73) Assignee: Motorola Mobility LLC, Chicago, IL (US)

( * ) Notice: Subject to any disclaimer, the term of this patent is extended or adjusted under 35 U.S.C. 154(b) by 120 days.

(21) Appl. No.: 17/015,593

(22) Filed: Sep. 9, 2020

(65) Prior Publication Data
US 2022/0038160 A1    Feb. 3, 2022

Related U.S. Application Data

(60) Provisional application No. 63/058,772, filed on Jul. 30, 2020.

(51) Int. Cl.
*H04B 7/06* (2006.01)
*H04B 17/309* (2015.01)
*H04W 84/04* (2009.01)

(52) U.S. Cl.
CPC ........ *H04B 7/0686* (2013.01); *H04B 17/309* (2015.01); *H04W 84/042* (2013.01)

(58) Field of Classification Search
CPC .......................... H04B 7/0686; H04W 84/042
See application file for complete search history.

(56) References Cited

U.S. PATENT DOCUMENTS

| | | | |
|---|---|---|---|
| 2019/0097715 A1* | 3/2019 | Maldonado | H04B 7/0814 |
| 2021/0067209 A1* | 3/2021 | Gopal | H04W 52/0216 |
| 2021/0218435 A1* | 7/2021 | Chen | H04B 1/006 |
| 2021/0320697 A1* | 10/2021 | Gopal | H04B 7/0608 |
| 2021/0329508 A1* | 10/2021 | Gopal | H04L 5/0048 |
| 2022/0069873 A1* | 3/2022 | Gopal | H04B 7/0604 |

OTHER PUBLICATIONS

Natarajan, Vimalkaushik et al., "Facilitating Antenna Switch Diversity for Dual-Connectivity Architectures", Technical Disclosure Commons, Defensive Publication Series, Art. 2494, Sep. 19, 2019, 14 pages.

* cited by examiner

*Primary Examiner* — Zhiren Qin
(74) *Attorney, Agent, or Firm* — FIG. 1 Patents

(57) ABSTRACT

Techniques for antenna system with multiple transmit paths are described and may be implemented via a wireless device to adapt to a variety of different wireless scenarios. Generally, the described techniques provide a wireless device with the ability to connect to different access points of a wireless network, such as 4G LTE and 5G NR portions of an UTRAN New Radio—Dual Connectivity (EN-DC)-compliant network. In at least some implementations, the described techniques utilize four-antenna systems configured to utilize low frequency bands, such as LTE low-band and 5G NR low-band frequencies. Further, the described systems enable multiple wireless protocols (e.g., LTE and 5G NR) to be used concurrently and cooperatively, such as to provide 5G NR connectivity utilizing an LTE network infrastructure.

20 Claims, 8 Drawing Sheets

ANTENNA SYSTEM WITH MULTIPLE TRANSMIT PATHS

RELATED APPLICATION

This application claims priority to U.S. Provisional App. No. 63/058,772, filed on 30 Jul. 2020 and titled "Antenna System with Multiple Transmit Paths," the disclosure of which is incorporated in its entirety by reference herein.

BACKGROUND

Wireless communication is ubiquitous and is used for a multitude of purposes, including wireless voice and data communication. Further, wireless protocols are constantly evolving to provide increased service levels for wireless users. For instance, recent developments in wireless technology have greatly increased the rate at which information can be transmitted wirelessly. One example of such a development is the 5G wireless cellular technology (e.g., 5G New Radio (NR)), which typically achieves higher data rates than previous wireless technologies. One form of 5G utilizes a non-standalone (NSA) architecture that relies on other forms of wireless infrastructure for certain tasks. For instance, an NSA 5G implementation known as E-UTRAN New Radio—Dual Connectivity (EN-DC) utilizes 4G wireless infrastructure to perform tasks such as mediating device connectivity while utilizing 5G for data throughput for connected devices. While higher data rates can be achieved utilizing EN-DC, such technologies exhibit a number of implementation challenges. For instance, for a device to take advantage of EN-DC connectivity, the device must have antennas and filters capable of receiving and passing signals in both 4G and 5G signal frequencies. This is typically done utilizing dual-purpose antennas to pass both 4G and 5G frequency bands. Such dual-purpose antennas, however, are subject to bandwidth constraints that make tuning the antennas difficult and thus reduce antenna performance.

BRIEF DESCRIPTION OF THE DRAWINGS

Aspects of antenna system with multiple transmit paths are described with reference to the following Figures. The same numbers may be used throughout to reference similar features and components that are shown in the Figures.

DETAILED DESCRIPTION

Techniques for antenna system with multiple transmit paths are described and may be implemented via a wireless device to adapt to a variety of different wireless scenarios. Generally, the described techniques provide a wireless device with the ability to connect to different access points of a wireless network, such as 4G LTE and 5G NR portions of an UTRAN New Radio—Dual Connectivity (EN-DC)-compliant network. In at least some implementations, the described techniques utilize four-antenna systems configured to utilize low frequency bands, such as LTE low-bands B5, B8, B12, B13, B14, B20, B26, B28, B71 and 5G NR low-bands n5, n8, n12, n13, n14, n20, n26, n28, n71 in the 617 megahertz (MHz) to 960 MHz frequency range. Further, the described systems enable multiple wireless protocols (e.g., LTE and 5G NR) to be used concurrently and cooperatively, such as to provide 5G NR connectivity utilizing an LTE network infrastructure. Generally, utilizing a four-antenna system provides multiple advantages over current EN-DC implementations, such as providing for increased antenna tunability and system flexibility for concurrent support of multiple different frequency bands. For instance, two antenna EN-DC systems typically require antennas that are able to transmit and receive over multiple wireless protocols in a single antenna, thus constraining and compromising the tunability and frequency response of the antennas. Further, two antenna systems require complex filter systems that increase the complexity and cost of devices that implement such systems.

While features and concepts of antenna system with multiple transmit paths can be implemented in any number of different devices, systems, environments, and/or configurations, aspects of antenna system with multiple transmit paths are described in the context of the following example devices, systems, and methods.

Figure 1:
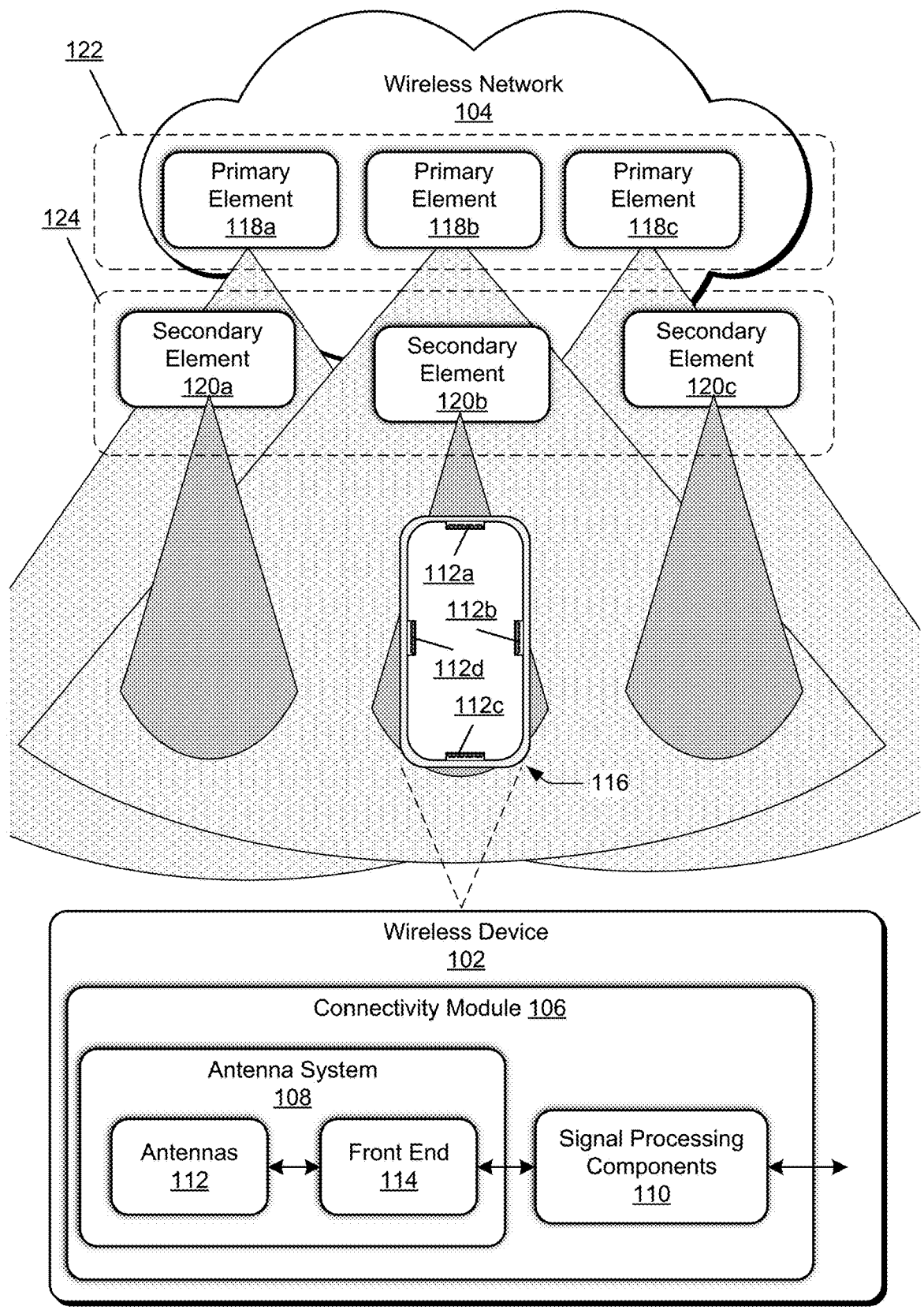
FIG. 1 illustrates an example environment in which aspects of antenna system with multiple transmit paths can be implemented.

FIG. 1 illustrates an example environment 100 in which aspects of antenna system with multiple transmit paths can be implemented. The example environment 100 includes a wireless computing device ("wireless device") 102 that is connectable to wireless network 104. In this particular example, the wireless device 102 represents a portable device that can be carried by a user, such as a smartphone, a tablet device, a laptop, a wearable computing device, (e.g., a smartwatch or a fitness tracker), and so forth. These examples are not to be construed as limiting, however, and the wireless device 102 can be implemented in a variety of different ways and form factors. Further example attributes of the wireless device 102 are discussed below with reference to the device 800 of FIG. 8.

The wireless device 102 includes various functionality that enables the wireless device 102 to perform different aspects of antenna system with multiple transmit paths discussed herein, including a connectivity module 106 with an antenna system 108 and signal processing components 110. The connectivity module 106 represents functionality (e.g., hardware and logic) that enables the wireless device 102 to communicate wirelessly, such as for wireless data and voice communication. The connectivity module 106, for instance, includes functionality to support different wireless protocols, such as wireless cellular (e.g., 3G, 4G, 5G), wireless broadband, Wireless Local Area Network (WLAN) (e.g., Wi-Fi), Wi-Fi Direct, wireless short distance communication (e.g., Bluetooth™ (including Bluetooth™ Low Energy (BLE)), Near Field Communication (NFC)), and so forth.

The antenna system 108 includes antennas 112 and a front end 114, which represent functionality (e.g., hardware) for enabling the wireless device 102 to send and receive wireless signal, such as for wireless connectivity to the wireless network 104. At least some individual antennas 112, for instance, each include a physical antenna device that is operable to receive wireless signal transmitted by the wireless network 104, and to transmit wireless signal for receipt by the wireless network 104. The antenna system 108 may include other hardware and logic, for as for adapting operating parameters of the antennas 112. The wireless device 102 may employ instances of the antennas 112 physically arranged at different locations on the wireless device 102, such as to optimize wireless performance of the wireless device 102.

For instance, the environment 100 depicts an internal view 116 that represents a view of the wireless device 102 with a surface removed, such as a display screen of the wireless device 102. Depicted in the internal view 116 is an antenna 112a, antenna 112b, antenna 112c, and antenna 112d, which represent different instances of the antennas 112. As shown, the antennas 112a-112d are each positioned at different physical locations on the wireless device 102. Further, the antennas 112a-112d are interconnected to provide an integrated antenna structure for enabling the wireless device to send and receive wireless signal. This particular arrangement of antennas 112 is presented for purpose of example only, and it is to be appreciated that the described implementations can utilize a variety of different arrangements of antennas not expressly described herein.

Generally, the front end 114 represents components that interface between the antenna system 108 and the signal processing components 110. The front end 114, for instance, represents a radio frequency (RF) front end that processes and/or routes analog signal to and from the antennas 112. As further detailed below, the front end 114 can include various types of components, such as switches, filters, amplifiers, multiplexers, and so forth. The signal processing components 110 represent functionality for performing processing of signal received from the front end 114, as well as signal received from other components of the wireless device 102 for routing to the front end 114. The signal processing components 110 can include various types of components, such as a transceiver, a modem, an analog-to-digital converter (ADC), a digital-to-analog converter (DAC), a mixer, and so forth.

To enable connectivity to the wireless network 104, the wireless network 104 includes primary network elements (primary elements) 118a, 118b, 118c, and secondary network elements (secondary elements) 120a, 120b, 120c. In at least one implementation and in the context of an EN-DC network, the primary elements 118 are part of a master cell group (MCG) 122 and the secondary elements 120 are part of a secondary cell group (SCG) 124. Generally, the primary elements 118 and the secondary elements 120 are representative of functionality to receive and transmit wireless signal and serve as access portals for the wireless network 104. The primary elements 118, for instance, represent functionality for enabling wireless connectivity via a first wireless protocol, and the secondary elements 120 represent functionality for enabling wireless connectivity via a second, different wireless protocol. In at least one implementation, the primary elements 118 represent wireless connectivity points (Evolved Node B (eNodeB)) for 4G LTE wireless connectivity, and the secondary elements 120 represent connectivity points (e.g., gNB) for 5G New Radio (NR) wireless connectivity. Generally, the primary elements 118 and the secondary elements 120 can cooperate to provide wireless connectivity to the wireless device 102, such as utilizing techniques for EN-DC.

For instance, in this particular example the primary element 118b and the secondary element 120b cooperate to enable the wireless device 102 to obtain 5G wireless connectivity to the wireless network 104. The primary element 118b, for instance, negotiates connectivity of the wireless device 102 to the wireless network 104, and the secondary element 120b provides 5G wireless throughput (transmit and receive) to the wireless device 102. As further detailed below, different instances of the antennas 112 can be utilized to differentially handle different aspects of wireless connectivity to the wireless network 104.

Figure 2:
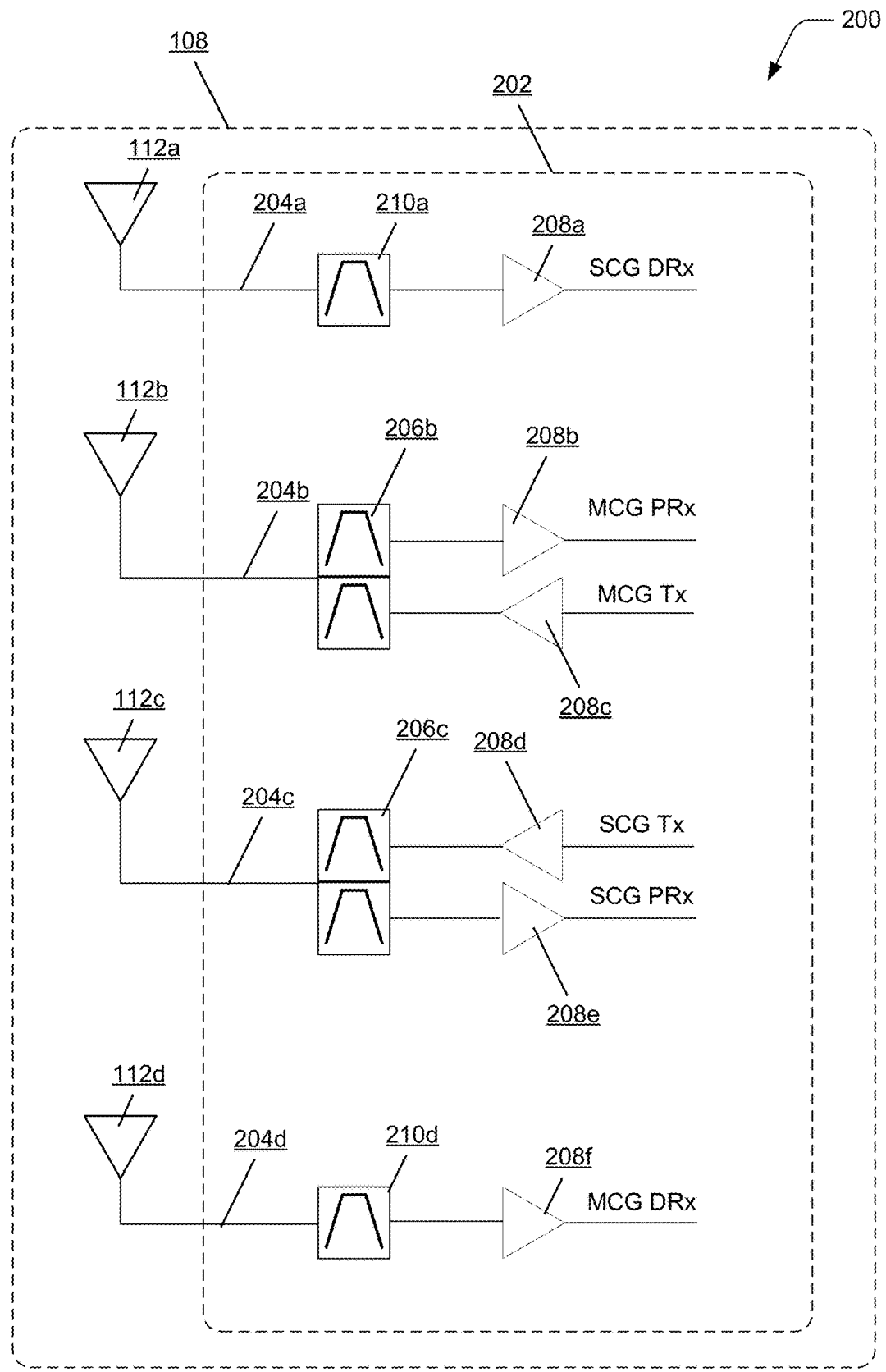
FIG. 2 depicts an example implementation of an antenna system in accordance with one or more implementations.

FIG. 2 depicts an implementation 200 of portions of the antenna system 108 including instances of the antennas 112 and at least some portions of a front end 202. The antenna system 108, for instance, includes the antenna 112a, antenna 112b, antenna 112c, and antenna 112d. The front end 202 generally represents an implementation of the front end 114 and includes signal paths 204a-204d.

Further to this particular implementation, the antenna 112b is connected to the signal path 204b, and the signal path 204b includes a duplexer 206b, an amplifier 208b, and an amplifier 208c. Generally, in the context of the environment 100, the signal path 204b provides transmit and primary receive functionality for connectivity of the wireless device 102 to the primary element 118b. In the context of an EN-DC implementation, for example, the antenna 112b provides primary receive (MCG PRx) and transmit (MCG Tx) functionality to a master cell group of an LTE network, e.g., the master cell group 122. Generally, the duplexer 206b includes bandpass filters configured for specific frequency ranges, such as for transmit and receive in an LTE frequency band.

The antenna 112c is connected to the signal path 204c, and the signal path 204c includes a duplexer 206c, an amplifier 208d, and an amplifier 208e. Generally, in the context of the environment 100, the signal path 204c provides transmit and primary receive functionality for connectivity of the wireless device 102 to the secondary element 120b. In the context of an EN-DC implementation, the antenna 112c provides primary receive (SCG PRx) and transmit (SCG Tx) functionality to a secondary cell group of 5G portions of an EN-DC network, e.g., the secondary cell group 124. Generally, the duplexer 206c includes bandpass filters configured for specific frequency ranges, such as for transmit and receive in a 5G frequency band.

The antenna 112a is connected to the signal path 204a, and the signal path 204a includes a filter 210a (e.g., a band pass filter) and an amplifier 208a. Generally, in the context of the environment 100, the signal path 204a provides antenna diversity receive functionality for the secondary element 120b. For instance, in the context of an EN-DC implementation, the antenna 112a provides diversity receive (SCG DRx) functionality to a secondary cell group of a 5G portion of an EN-DC network, e.g., the secondary cell group 124.

The antenna 112d is connected to the signal path 204d, and the signal path 204d includes a filter 210d and an amplifier 208f Generally, in the context of the environment 100, the signal path 204d provides antenna diversity receive functionality for the primary element 118b. For instance, in the context of an EN-DC implementation, the signal path 204d provides diversity receive (MCG DRx) functionality to a master cell group of an LTE portion of an EN-DC network, e.g., the master cell group 122.

In at least one implementation, the antenna system 108 is configured to provide EN-DC connectivity in low frequency bands of the LTE and 5G frequency bands. For instance, in this particular configuration, the antennas 112b and 112d provide wireless functionality in LTE low frequency bands, and the antennas 112a and 112c provide wireless functionality in 5G low frequency bands.

Figure 3:
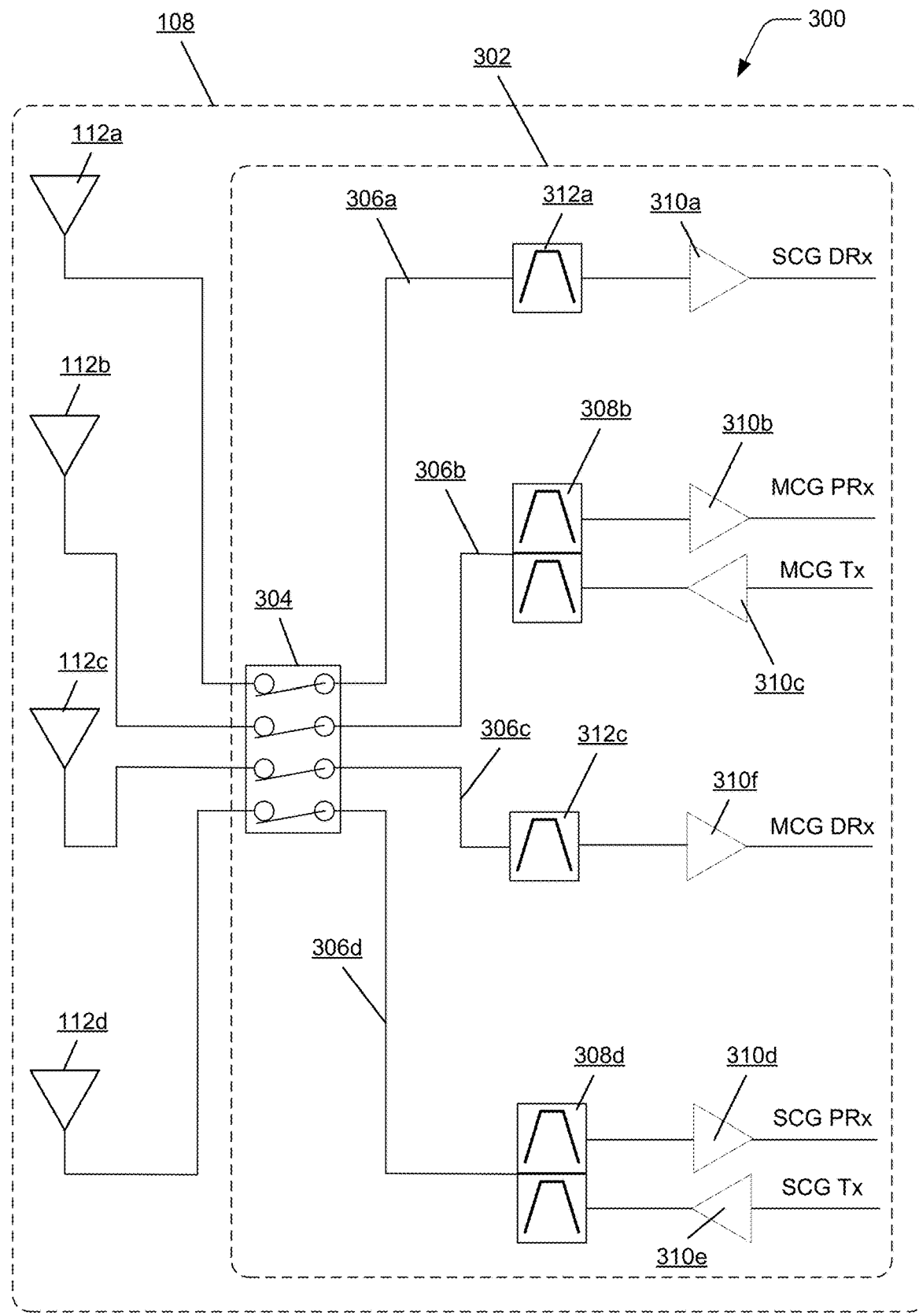
FIG. 3 depicts an example implementation of an antenna system in accordance with one or more implementations.

FIG. 3 depicts an implementation 300 of portions of the antenna system 108 including instances of the antennas 112 and at least some portions of a front end 302. The front end 302 generally represents an implementation of the front end 114 and includes a switch 304 and signal paths 306a-306d. The antennas 112 and the signal paths 306 are connected to the switch 304, and the switch 304 is operable to connect instances of the antennas 112 across different instances of the signal paths 306. In at least one implementation, the switch 304 represents a four-pole, four-throw (4P4T) switch that is operable to connect any single instance of an antenna 112 to any single instance of the signal paths 306.

Further to this particular implementation, the antenna 112b is connected to the signal path 306b, and the signal path 112b includes a duplexer 308b, an amplifier 310b, and an amplifier 310c. Generally, in the context of the environment 100, the signal path 306b provides transmit and primary receive functionality for connectivity of the wireless device 102 to the primary element 118b. In the context of an EN-DC implementation, for example, the antenna 112b provides primary receive (MCG PRx) and transmit (MCG Tx) functionality to a master cell group of an LTE network, e.g., the master cell group 122. Generally, the duplexer 308b includes bandpass filters configured for specific frequency ranges, such as in an LTE frequency band.

The antenna 112d is connected to the signal path 306d, and the signal path 306d includes a duplexer 308d, an amplifier 310d, and an amplifier 310e. Generally, in the context of the environment 100, the signal path 306d provides transmit and primary receive functionality for connectivity of the wireless device 102 to the secondary element 120b. In the context of an EN-DC implementation, the signal path 306d provides primary receive (SCG PRx) and transmit (SCG Tx) functionality to a secondary cell group of 5G portions of an EN-DC network, e.g., the secondary cell group 124. Generally, the duplexer 308d includes bandpass filters configured for specific frequency ranges, such as in a 5G frequency band.

The antenna 112a is connected to the signal path 306a, and the signal path 306a includes a filter 312a (e.g., a band pass filter) and an amplifier 310a. Generally, in the context of the environment 100, the signal path 306a provides antenna diversity receive functionality for the secondary element 120b. For instance, in the context of an EN-DC implementation, the signal path 306a provides diversity receive (SCG DRx) functionality to a secondary cell group of a 5G portion of an EN-DC network, e.g., the secondary cell group 124.

The antenna 112c is connected to the signal path 306c, and the signal path 306c includes a filter 312c and an amplifier 310f. Generally, in the context of the environment 100, the signal path 306c provides antenna diversity receive functionality for the primary element 118b. For instance, in the context of an EN-DC implementation, the signal path 306c provides diversity receive (MCG DRx) functionality to a master cell group of an LTE portion of an EN-DC network, e.g., the master cell group 122.

In at least one implementation, the antenna system 108 is configured to provide EN-DC connectivity in low frequency bands of the LTE and 5G frequency bands. For instance, in this particular implementation, the antennas 112b and 112c provide wireless functionality in LTE low frequency bands, and the antennas 112a and 112d provide wireless functionality in 5G low frequency bands.

By utilizing the switch 304, the antenna system 108 supports implementations for antenna switch diversity (AS-Div). For instance, consider that the connectivity module 106 detects that signal quality (e.g., signal strength, signal-to-noise ratio, etc.) decreases across one of the signal paths 306. Various factors may result in decrease of signal quality, such as user obstruction of an antenna based on a user's grip position of the wireless device 102, an object that obstructs wireless signal, and so forth. Accordingly, to attempt to mitigate the decrease in signal quality, the connectivity module 106 can leverage the switch 304 to switch an antenna 112 utilized for the particular signal path.

As one example, consider that signal quality across the signal path 306b degrades, such as based on detecting a decrease in signal strength on the receive path (MCG PRx). Accordingly, the connectivity module 106 can leverage the switch 304 to switch the signal path 306b to a different antenna, e.g., from the antenna 112b to the antenna 112d. Generally, this causes the transmit and primary receive lines for the master cell group (MCG Tx, MCG PRx) to connect to the antenna 112d. Further, this causes the transmit and primary receive lines for the secondary cell group (SCG Tx, SCG PRx) to connect to the antenna 112b, e.g., switch antennas with the master cell group transmit and primary receive. In at least one implementation, this is based on a prioritization of the master cell group over the secondary cell group. This example of implementing antenna switch diversity is presented for purpose of illustration, and it is to be appreciated that a wide variety of different antenna 112 and signal path 306 configurations can be generated using the antenna system 108.

Figure 4:
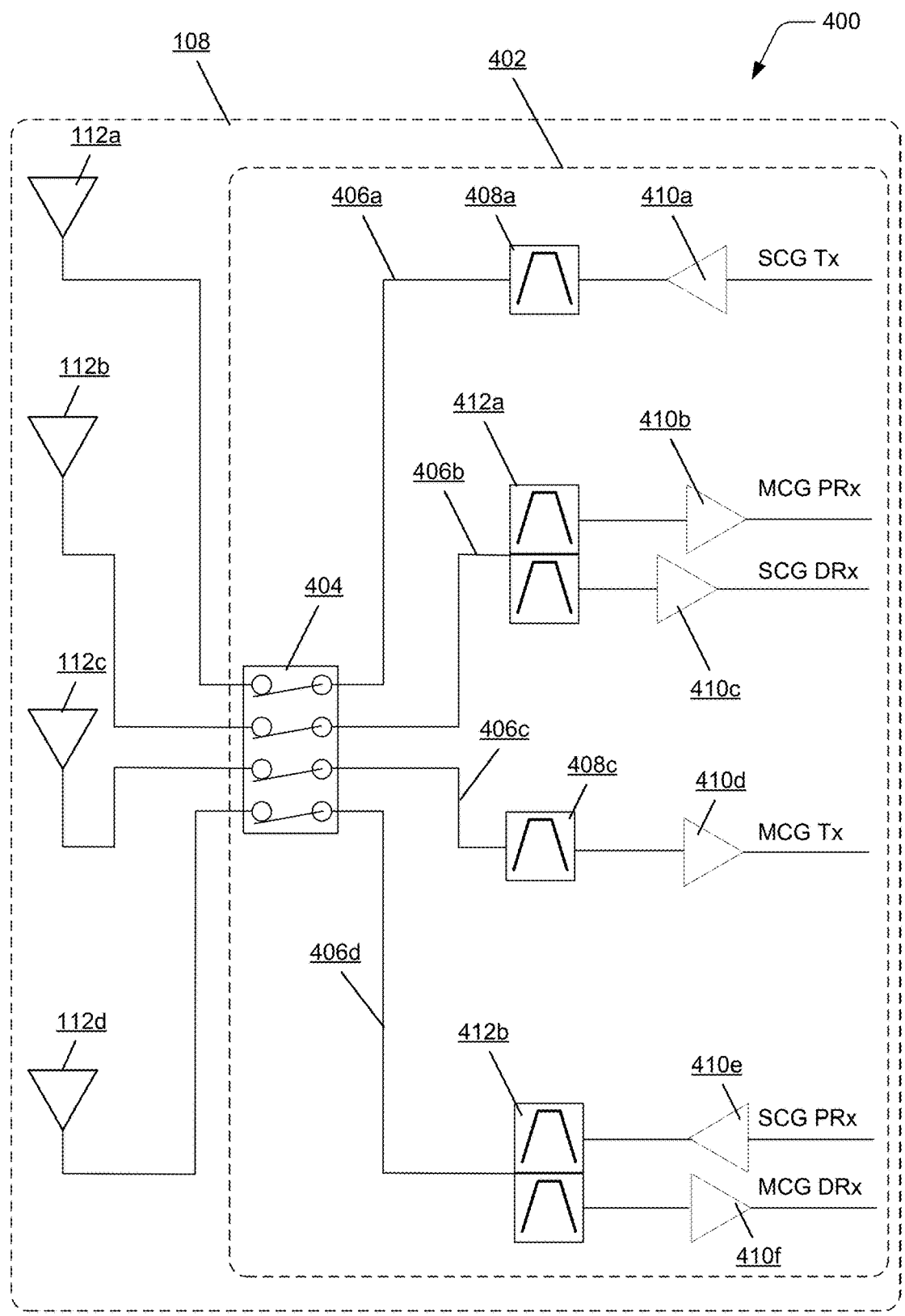
FIG. 4 depicts an example implementation of an antenna system in accordance with one or more implementations.

FIG. 4 depicts an implementation 400 of portions of the antenna system 108, which represents a variation on the implementations 200, 300 depicted in FIGS. 2 and 3. In the implementation 400, the transmit and receive signals are separated on different signal paths and antennas (e.g., a "simplex" architecture), which enables transmit and receive performance to be further optimized. In the implementation 400, the antenna system 108 includes the antennas 112a-112d and a front end 402, which represents an implementation of the front end 114. Further, the front end 402 includes a switch 404 and signal paths 406a, 406b, 406c, 406d. In at least one implementation, the switch 404 represents a 4P4T switch with instances of the antennas 112 each connected to a different respective pole, and instances of the signal paths 406a-406d each selected to a different respective pole.

In the front end 402, the antenna 112a is connected to the signal path 406a, and the signal path 406a includes a filter 408a and an amplifier 410a. In the context of the environment 100, the signal path 406a provides transmit functionality for the wireless device 102 to the secondary element 120b. In the context of an EN-DC implementation, for example, the signal path 406a provides transmit functionality (SCG Tx) functionality of the wireless device 102 to a secondary cell group of a 5G network, e.g., the secondary cell group 124.

Further, the antenna 112b is connected to the signal path 406b, and the signal path 406b includes a duplexer 412a, an amplifier 410b, and an amplifier 410c. In the context of the environment 100, the signal path 406b provides primary receive functionality for the wireless device 102 from the master cell group 122, and diversity receive functionality from the secondary cell group 124. In the context of an EN-DC implementation, for example, signal path 406b provides primary receive (MCG PRx) functionality of the wireless device 102 to a master cell group of an LTE network, and diversity receive (SCG DRx) functionality of the wireless device 102 to secondary cell group of a 5G network.

Further, the antenna 112c is connected to the signal path 406c, and the signal path 406c includes a filter 408c and an amplifier 410d. In the context of the environment 100, for example, the signal path 406c provides transmit functionality for the wireless device 102 to the master cell group 122. For instance, in the context of an EN-DC implementation, the signal path 406c provides transmit (MCG Tx) functionality of the wireless device 102 to a master cell group of an LTE network.

Still further, the antenna 112d is connected to the signal path 406d, and the signal path 406d includes a duplexer 412b, an amplifier 410e, and an amplifier 410f. In the context of the environment 100, for example, the signal path 406d provides primary receive functionality to the wireless device 102 from the secondary cell group 124, and diversity receive functionality from the master cell group 122. For instance, in the context of an EN-DC implementation, the signal path 406d provides primary receive (SCG PRx) functionality to a secondary cell group of 5G portions of the EN-DC network, and diversity receive (MCG DRx) functionality to a master cell group of LTE portions of the EN-DC network.

Generally, by utilizing the switch 404, the antenna system 108 supports implementations for ASDiv, such as discussed above with reference to the implementation 300. For instance, different instances of the antennas 112a-112d can be switched between different connectivities to the signal paths 406a-406d to provide a wide variety of different functional combinations for wireless signal transmit and receive scenarios.

Figure 5:
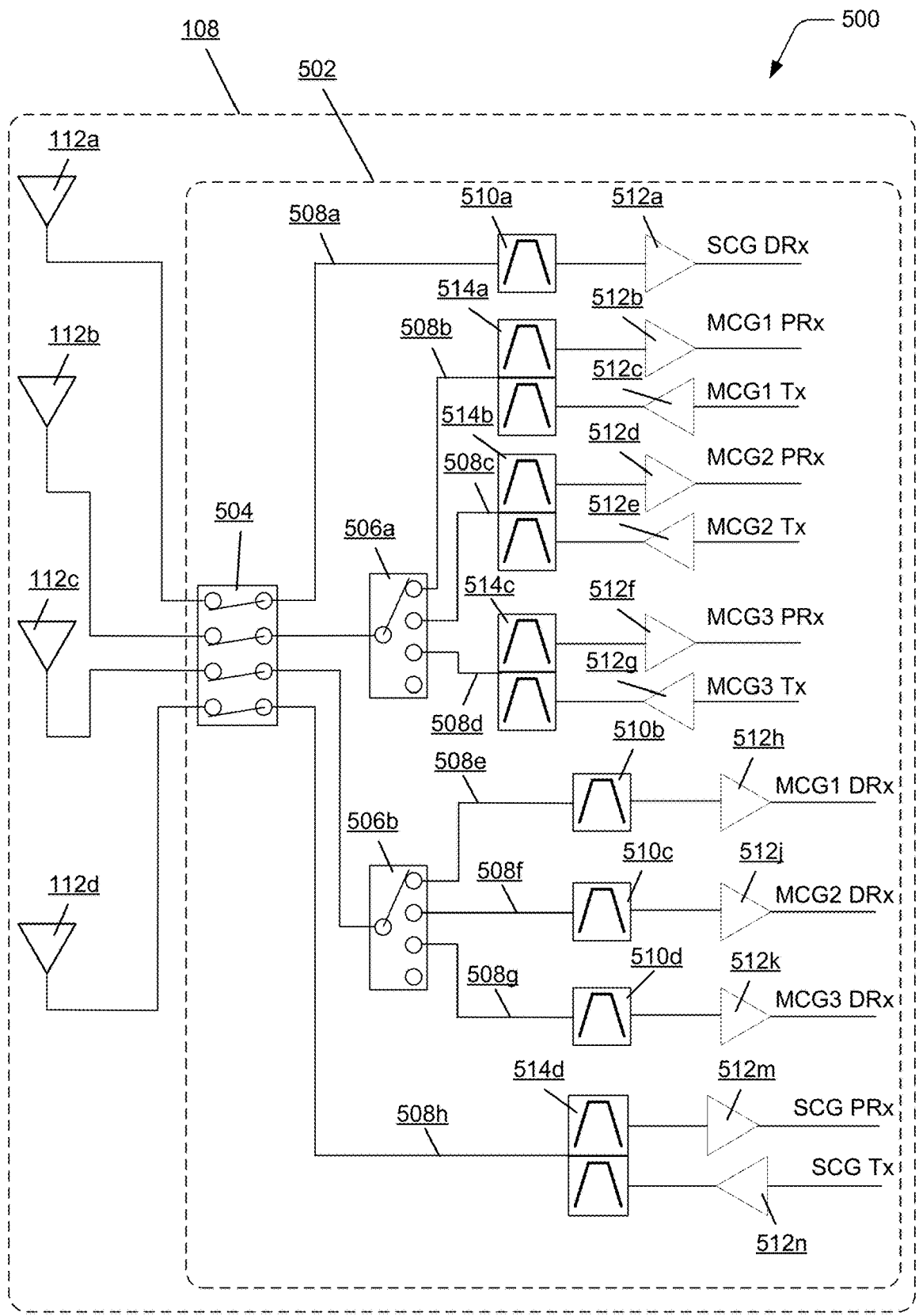
FIG. 5 depicts an example implementation of an antenna system in accordance with one or more implementations.

FIG. 5 depicts an implementation 500 of portions of the antenna system 108, which represents a variation on the implementations 200-400 depicted in FIGS. 2-4. In the implementation 500, additional sets of signal paths are included to support multiple different bands, such as multiple different LTE bands. The implementation 500 includes the antennas 112a-112d and a front end 502, which represents an implementation of the front end 114. The front end 502 includes a switch 504 and switches 506a, 506b. The switch 504, for instance, represents a 4P4T switch to which the antennas 112a-112d are connected to different respective pole. In at least one implementation, the switches 506a, 506b each represent a single pole four throw switch that is connected to a different contact on the switch 504, discussed in more detail below.

The front end 502 further includes a signal paths 508a, 508b, 508c, 508d, 508e, 508f, 508g, and 508h. The signal path 508a includes a filter 510a and an amplifier 512a, and in this configuration is connected to the antenna 112a. Generally, the signal path 508a provides diversity receive functionality for the wireless device 102 to the secondary cell group 124. In the context of an EN-DC implementation, for example, the signal path 508a provides diversity receive (SCG DRx) functionality from a secondary cell group of 5G portions of an EN-DC network.

The signal path 506b includes a duplexer 514a, an amplifier 512b, and an amplifier 512c; the signal path 508c includes a duplexer 514b, an amplifier 512d, and an amplifier 512e; and the signal path 508d includes a duplexer 514c, an amplifier 512f, and an amplifier 512g. Generally, the signal paths 508b-508c each provide transmit and primary receive paths for different frequency bands for the master cell group 122. For instance, the signal path 508b provides transmit and primary receive for a first master cell group frequency band (MCG1 Tx, MCG1 PRx), the signal path 508c provides transmit and primary receive for a second master cell group frequency band (MCG2 Tx, MCG2 PRx), and the signal path 508c provides transmit and primary receive for a third master cell group frequency band (MCG3 Tx, MCG3 PRx).

In this configuration, the switches 504 and 506a are positioned to connect the antenna 112b to the signal path 508b. Thus, the antenna system 108 is configured in this functional position to support transmit and primary receive for a frequency band utilized by a master cell group 1 (MCG1).

Further to the implementation 500, the signal path 508e includes a filter 510b and an amplifier 512h; the signal path 508f includes a filter 510c and an amplifier 512j; and the signal path 508g includes a filter 510d and an amplifier 512k. Generally, the signal paths 508e-508g provide diversity receive paths for different frequency bands for the master cell group 124. For instance, the signal path 508e provides diversity receive for a first master cell group frequency band (MCG1 DRx), the signal path 508f provides diversity receive for a second master cell group frequency band (MCG2 DRx), and the signal path 508g provides diversity receive for a third master cell group frequency band (MCG3 DRx). In this configuration, the switches 504 and 506b are positioned to connect the antenna 112c to the signal path 508e. Thus, the antenna system 108 in this implementation is configured to support diversity receive for a frequency band utilized by the master cell group 1 (MCG1).

The signal path 508h includes a duplexer 514d, an amplifier 512m, and an amplifier 512n. Generally, the signal path 508h provides a transmit and primary receive path for the secondary cell group 124. For instance, the signal path 508h provides a transmit and primary receive path for a secondary cell group (SCG Tx, SCG PRx) of a 5G cell group.

By providing different transmission and receive paths across different master cell group frequency bands, the implementation 500 enables the wireless device 102 to adapt to different wireless scenarios, such as LTE networks that utilize different LTE bands. The connectivity module 106, for instance, may dynamically switch the antenna system 108 to adapt to changes in network coverage, such as changes in frequency bands utilized by a particular primary cell group 122 and/or different primary cell groups 122.

Figure 6:
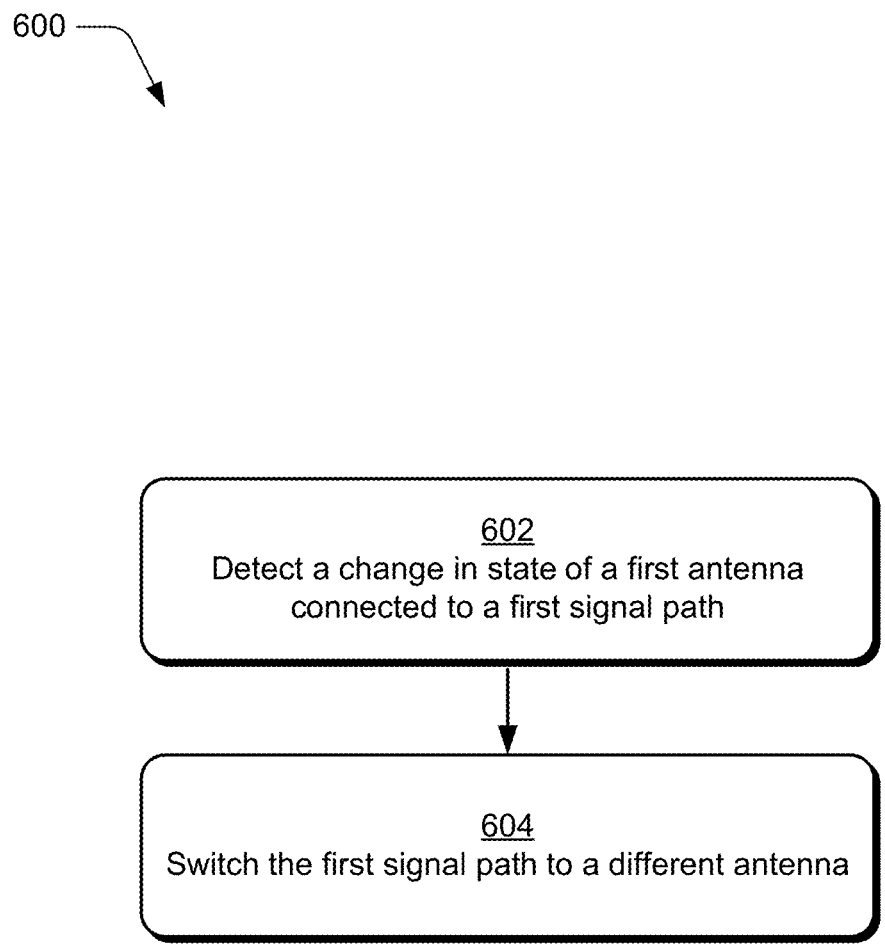
FIG. 6 depicts a method for antenna switching in accordance with one or more implementations.

FIG. 6 depicts a method 600 for antenna switching in accordance with one or more implementations. At 602, a change in state of a first antenna connected to a first signal path is detected. The connectivity module 106, for instance, detects a reduction in signal quality across a particular signal path and/or an antenna obstruction of a particular antenna 112. In at least one implementation, this may be based on a notification from a different functionality of the wireless device 102, such as a processing system, a sensor system, and so forth.

At 604, the first signal path is switched to a different antenna. The connectivity module 106, for example, actuates a switch to switch the first signal path to a different antenna 112. In at least one implementation, this causes a second signal path to be disconnected from the different antenna and connected to the first antenna.

Figure 7:
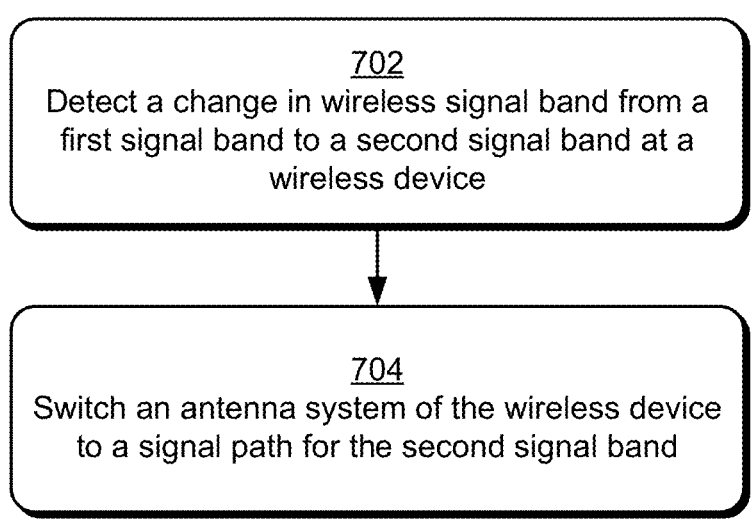
FIG. 7 depicts a method for signal path switching in accordance with one or more implementations.

FIG. 7 depicts a method 700 for signal path switching in accordance with one or more implementations. At 702, a change in wireless signal band from a first signal band to a second signal band is detected at a wireless device. The connectivity module 106, for instance, detects a change in signal band utilized by a particular cell group, such as a Master Cell Group of an LTE wireless cellular network. In at least one implementation, this may be based on the wireless device 102 roaming from one geographic region to another.

At 704, an antenna system of the wireless device is switched to a signal path for the second signal band. The connectivity module 106, for example, actuates a switch to switch from a first signal path for the first signal band, to a second signal path for a second signal band. In at least one implementation, the signal bands represent different LTE signal bands utilized by a particular wireless network and/or wireless carrier. In at least some implementations, multiple different signal paths for multiple different signal bands are available in an antenna system such that the connectivity module 106 can dynamically switch between the different signal paths to support a variety of different connectivity scenarios.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 8:
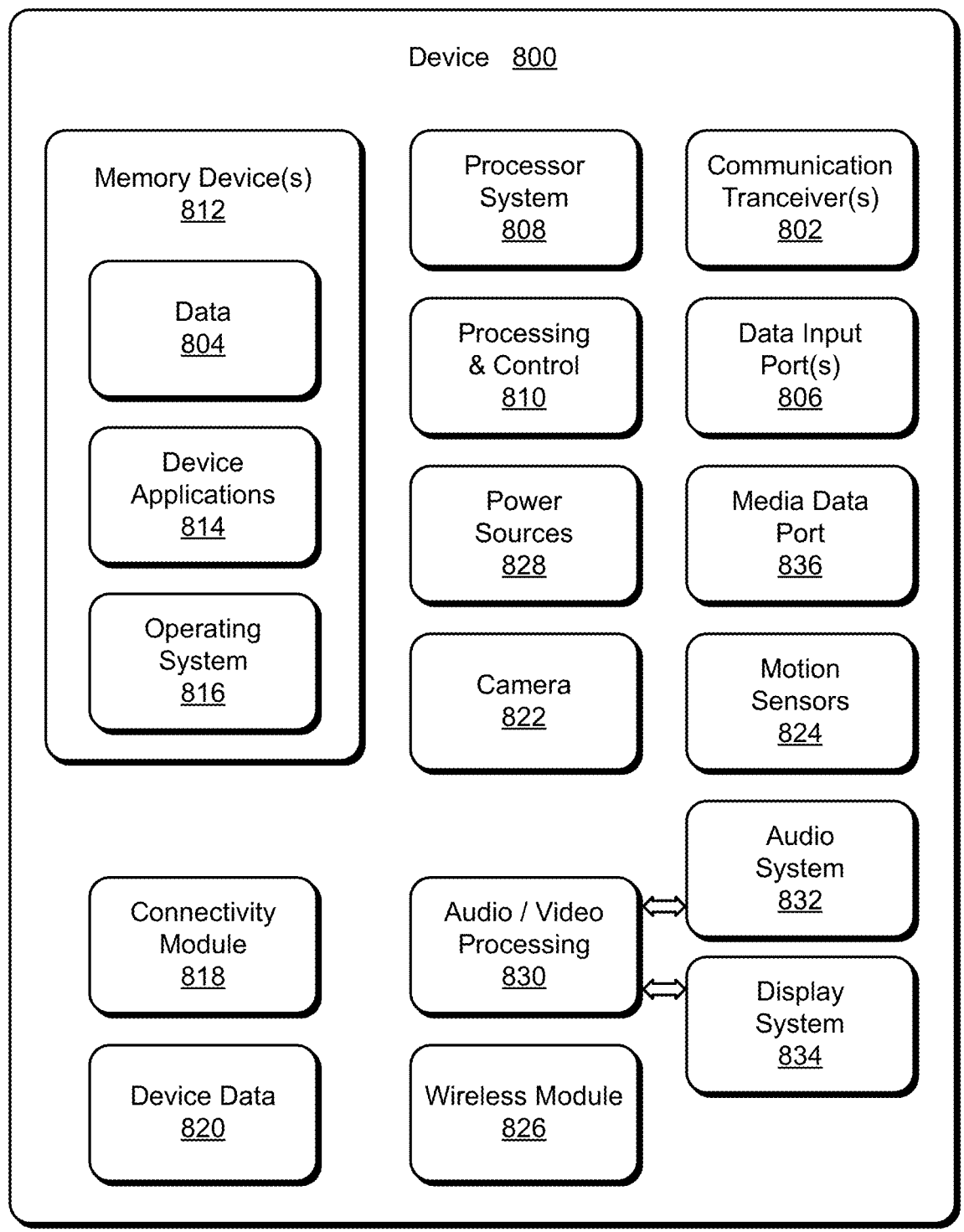
FIG. 8 illustrates various components of an example device that can implement aspects of antenna system with multiple transmit paths.

FIG. 8 illustrates various components of an example device 800 in which aspects of antenna system with multiple transmit paths can be implemented. The example device 800 can be implemented as any of the devices described with reference to the previous FIGS. 1-7, such as any type of wireless device, mobile phone, mobile device, wearable device, tablet, computing, communication, entertainment, gaming, media playback, and/or other type of electronic device. For example, the wireless device 102 as shown and described with reference to FIGS. 1-7 may be implemented as the example device 800.

The device 800 includes communication transceivers 802 that enable wired and/or wireless communication of data 804 with other devices. The data 804 can include any of device identifying data, device location data, wireless connectivity data, and wireless protocol data. Additionally, the data 804 can include any type of audio, video, and/or image data. Example communication transceivers 802 include wireless personal area network (WPAN) radios compliant with various IEEE 802.15 (Bluetooth™) standards, wireless local area network (WLAN) radios compliant with any of the various IEEE 802.11 (Wi-Fi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 800 may also include one or more data input ports 806 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 800 includes a processor system 808 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 810. The device 800 may further include any type of a system bus or other data and command transfer system that couples the various components within the device. A system bus can include any one or combination of different bus structures and architectures, as well as control and data lines.

The device 800 also includes computer-readable storage memory 812 (e.g., memory devices) that enable data storage, such as data storage devices that can be accessed by a computing device, and that provide persistent storage of data and executable instructions (e.g., software applications, programs, functions, and the like). Examples of the computer-readable storage memory 812 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 800 may also include a mass storage media device.

The computer-readable storage memory 812 provides data storage mechanisms to store the data 804, other types of information and/or data, and various device applications 814 (e.g., software applications). For example, an operating system 816 can be maintained as software instructions with a memory device and executed by the processing system 808. The device applications may also include a device manager, such as any form of a control application, software application, signal-processing and control module, code that is native to a particular device, a hardware abstraction layer for a particular device, and so on. Computer-readable storage memory 812 represents media and/or devices that enable persistent and/or non-transitory storage of information in contrast to mere signal transmission, carrier waves, or signals per se. Computer-readable storage memory 812 do not include signals per se or transitory signals.

In this example, the device 800 includes a connectivity module 818 that implements aspects of antenna system with multiple transmit paths, and may be implemented with hardware components and/or in software as one of the device applications 814, such as when the device 800 is implemented as the wireless device 102. An example, the connectivity module 818 can be implemented as the connectivity module 106 described in detail above. In implementations, the connectivity module 818 may include independent processing, memory, and logic components as a computing and/or electronic device integrated with the device 800. The device 800 also includes device data 820 for implementing aspects of antenna system with multiple transmit paths and may include data from the connectivity module 106.

In this example, the example device 800 also includes a camera 822 and motion sensors 824, such as may be implemented in an inertial measurement unit (IMU). The motion sensors 824 can be implemented with various sensors, such as a gyroscope, an accelerometer, and/or other types of motion sensors to sense motion of the device. The various motion sensors 824 may also be implemented as components of an inertial measurement unit in the device.

The device 800 also includes a wireless module 826, which is representative of functionality to perform various wireless communication tasks. For instance, for the wireless device 102, the wireless module 826 can be leveraged to scan for and detect wireless networks, as well as negotiate wireless connectivity to wireless networks for the wireless device 102. The device 800 can also include one or more power sources 828, such as when the device is implemented as a wireless device. The power sources 828 may include a charging and/or power system, and can be implemented as a flexible strip battery, a rechargeable battery, a charged super-capacitor, and/or any other type of active or passive power source. Generally, utilizing implementations of antenna system with multiple transmit paths enables the power sources 828 to be conserved as part of a wireless network connectivity process.

The device 800 also includes an audio and/or video processing system 830 that generates audio data for an audio system 832 and/or generates display data for a display system 834. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 836. In implementations, the audio system and/or the display system are integrated components of the example device. Alternatively, the audio system and/or the display system are external, peripheral components to the example device.

Although implementations of antenna system with multiple transmit paths have been described in language specific to features and/or methods, the subject of the appended claims is not necessarily limited to the specific features or methods described. Rather, the features and methods are disclosed as example implementations of antenna system with multiple transmit paths, and other equivalent features and methods are intended to be within the scope of the appended claims. Further, various different examples are described, and it is to be appreciated that each described example can be implemented independently or in connection with one or more other described examples. Additional aspects of the techniques, features, and/or methods discussed herein relate to one or more of the following:

A wireless device including: a set of antennas; and a set of signal paths to support wireless communication for the wireless device, the signal paths including: a first signal path including a first duplexer, the first signal path being operably connected to a first antenna of the set of antennas and configured to support transmission to and primary receive from a first cell group of a wireless network; a second signal path including a second duplexer, the second signal path operably connected to a second antenna of the set of antennas and configured to support transmission to and primary receive from a second cell group of the wireless network; a third signal path including a first filter, the third signal path connected to a third antenna of the set of antennas and configured to support antenna diversity receive from the first cell group of the wireless network; and a fourth signal path including a second filter, the fourth signal path connected to a fourth antenna of the set of antennas and configured to support antenna diversity receive from the second cell group of the wireless network.

Alternatively or in addition to the above described device, any one or combination of: wherein the wireless network includes an E-UTRAN New Radio—Dual Connectivity (EN-DC)-compliant network, the first cell group includes a Long Term Evolution (LTE) portion of the wireless network, and the second cell group includes a 5G New Radio (NR) portion of the wireless network; further including a switch operatively connected to the set of antennas and the set of signal paths, wherein the switch is operable to change connectivity between antennas of the set of antennas and the signal paths as part of an antenna diversity implementation; further including a switch operatively connected to the set of antennas and the set of signal paths, wherein the switch is operable to disconnect the first signal path from the first antenna, and to connect the first signal path to a different antenna of the set of antennas as part of an antenna diversity implementation; further including a connectivity module implemented to cause the switch to disconnect the first signal path from the first antenna, and to connect the first signal path to the different antenna of the set of antennas in response to detecting a reduction in signal quality at the first antenna; further including a connectivity module implemented to cause the switch to disconnect the first signal path from the first antenna, and to connect the first signal path to the different antenna of the set of antennas in response to detecting a physical obstruction of the first antenna; further including: a first switch operatively connected to the set of antennas, the second signal path, and the fourth signal path; a second switch operatively connected to the first switch and the first signal path, the first signal path being configured for a first signal band; a third switch operatively connected to the first switch and the third signal path, the third signal path being configured for the first signal band; a fifth signal path operatively connected to the second switch and configured for a second signal band; a sixth signal path operatively connected to the third switch and configured for the second signal band, wherein the second switch is operable to switch between the first signal path and the fifth signal path to enable switching between the first signal band and the second signal band for transmission to and primary receive from the first cell group of the wireless network, and the third switch is operable to switch between the third signal path and the sixth signal path to enable the first signal band and the second signal band for diversity receive from the first cell group of the wireless network; further including: a first switch operatively connected to the set of antennas, the second signal path, and the fourth signal path; a second switch operatively connected to the first switch and the first signal path, the first signal path being configured for a first signal band; a third switch operatively connected to the first switch and the third signal path, the third signal path being configured for the first signal band; a fifth signal path operatively connected to the second switch and configured for a second signal band; a sixth signal path operatively connected to the third switch and configured for the second signal band, wherein the second switch is operable to switch between the first signal path and the fifth signal path to enable wireless communication via the first signal band, and the third switch is operable to switch between the third signal path and the sixth signal path to enable wireless communication via the second signal band; wherein the first signal band includes a first Long Term Evolution (LTE) band utilized by the first cell group of the wireless network, and the second signal band includes second LTE band utilized by a different cell group of the wireless network; further including a connectivity module implemented to detect a transition of the wireless device from the first cell group to the different cell group and in response, cause the second switch to switch between the first signal path and the fifth signal path, and the third switch to switch between the third signal path and the sixth signal path.

An antenna system including: a set of antennas; and a set of signal paths to support wireless communication for a wireless device, the signal paths including: a first signal path including a first duplexer, the first signal path being operably connected to a first antenna of the set of antennas and configured to support transmission to and primary receive from a first cell group of a wireless network; a second signal path including a second duplexer, the second signal path operably connected to a second antenna of the set of antennas and configured to support transmission to and primary receive from a second cell group of the wireless network; a third signal path including a first filter, the third signal path connected to a third antenna of the set of antennas and configured to support antenna diversity receive from the first cell group of the wireless network; and a fourth signal path including a second filter, the fourth signal path connected to a fourth antenna of the set of antennas and configured to support antenna diversity receive from the second cell group of the wireless network.

Alternatively or in addition to the above described antenna system, any one or combination of: wherein the wireless network includes an E-UTRAN New Radio—Dual Connectivity (EN-DC)-compliant network, the first cell group includes a Long Term Evolution (LTE) portion of the wireless network, and the second cell group includes a 5G New Radio (NR) portion of the wireless network; further including a switch operatively connected to the set of antennas and the set of signal paths, wherein the switch is operable to disconnect the first signal path from the first antenna, and to connect the first signal path to a different antenna of the set of antennas as part of an antenna diversity implementation; further including a connectivity module implemented to cause the switch to disconnect the first signal path from the first antenna, and to connect the first signal path to the different antenna of the set of antennas in response to detecting one or more of a reduction in signal quality at the first antenna or a physical obstruction of the first antenna; further including: a first switch operatively connected to the set of antennas, the second signal path, and the fourth signal path; a second switch operatively connected to the first switch and the first signal path, the first signal path being configured for a first signal band; a third switch operatively connected to the first switch and the third signal path, the third signal path being configured for the first signal band; a fifth signal path operatively connected to the second switch and configured for a second signal band; a sixth signal path operatively connected to the third switch and configured for the second signal band, wherein the second switch is operable to switch between the first signal path and the fifth signal path to enable wireless communication via the first signal band, and the third switch is operable to switch between the third signal path and the sixth signal path to enable wireless communication via the second signal band; wherein the first signal band includes a first Long Term Evolution (LTE) band utilized by the first cell group of the wireless network, and the second signal band includes second LTE band utilized by a different cell group of the wireless network.

A wireless device including: a set of antennas; and a set of signal paths to support wireless communication for the wireless device, the signal paths including: a first signal path including a first duplexer, the first signal path being operably connected to a first antenna of the set of antennas and configured to support wireless primary receive from a first cell group of a wireless network, and diversity receive from a second cell group of the wireless network; a second signal path including a second duplexer, the second signal path operably connected to a second antenna of the set of antennas and configured to support primary receive from the second cell group and diversity receive from the first cell group; a third signal path including a first filter, the third signal path connected to a third antenna of the set of antennas and configured to support transmission to the primary cell group; and a fourth signal path including a second filter, the fourth signal path connected to a fourth antenna of the set of antennas and configured to support transmission to the second cell group.

Alternatively or in addition to the above described device, any one or combination of: wherein the wireless network includes an E-UTRAN New Radio—Dual Connectivity (EN-DC)-compliant network, the first cell group includes a Long Term Evolution (LTE) portion of the wireless network, and the second cell group includes a 5G New Radio (NR) portion of the wireless network; further including a switch operatively connected to the set of antennas and the set of signal paths, wherein the switch is operable to disconnect the first signal path from the first antenna, and to connect the first signal path to a different antenna of the set of antennas as part of an antenna diversity implementation; further including a connectivity module implemented to cause the switch to disconnect the first signal path from the first antenna, and to connect the first signal path to the different antenna of the set of antennas in response to detecting one or more of a reduction in signal quality at the first antenna or a physical obstruction of the first antenna.

The invention claimed is:
1. A wireless device comprising:
    a set of antennas; and
    a set of signal paths to support wireless communication for the wireless device, the signal paths including:
        a first signal path including a first duplexer, the first signal path being operably connected to a first antenna of the set of antennas and configured to support transmission to and primary receive from a first cell group of a wireless network;
        a second signal path including a second duplexer, the second signal path operably connected to a second antenna of the set of antennas and configured to support transmission to and primary receive from a second cell group of the wireless network;

a third signal path including a first filter, the third signal path connected to a third antenna of the set of antennas and configured to support antenna diversity receive from the first cell group of the wireless network;

a fourth signal path including a second filter, the fourth signal path connected to a fourth antenna of the set of antennas and configured to support antenna diversity receive from the second cell group of the wireless network;

a first switch operatively connected to the set of antennas, the second signal path, and the fourth signal path;

a second switch operatively connected to the first switch and the first signal path, the first signal path being configured for a first signal band;

a third switch operatively connected to the first switch and the third signal path, the third signal path being configured for the first signal band;

a fifth signal path operatively connected to the second switch and configured for a second signal band; and a sixth signal path operatively connected to the third switch and configured for the second signal band, wherein the second switch is operable to switch between the first signal path and the fifth signal path to enable wireless communication via the first signal band, and the third switch is operable to switch between the third signal path and the sixth signal path to enable wireless communication via the second signal band.

2. The wireless device as recited in claim 1, wherein the wireless network comprises an E-UTRAN New Radio-Dual Connectivity (EN-DC)-compliant network, the first cell group comprises a Long Term Evolution (LTE) portion of the wireless network, and the second cell group comprises a 5G New Radio (NR) portion of the wireless network.

3. The wireless device as recited in claim 1, wherein at least one of the first switch, the second switch, or the third switch is operable to change connectivity between antennas of the set of antennas and the signal paths as part of an antenna diversity implementation.

4. The wireless device as recited in claim 1, wherein at least one of the first switch, the second switch, or the third switch is operable to disconnect the first signal path from the first antenna, and to connect the first signal path to a different antenna of the set of antennas as part of an antenna diversity implementation.

5. The wireless device as recited in claim 4, further comprising a connectivity module implemented to cause the switch at least one of the first switch, the second switch, or the third switch to disconnect the first signal path from the first antenna, and to connect the first signal path to the different antenna of the set of antennas in response to detecting a reduction in signal quality at the first antenna.

6. The wireless device as recited in claim 4, further comprising a connectivity module implemented to cause at least one of the first switch, the second switch, or the third switch to disconnect the first signal path from the first antenna, and to connect the first signal path to the different antenna of the set of antennas in response to detecting a physical obstruction of the first antenna.

7. The wireless device as recited in claim 1, wherein the first signal band comprises a first Long Term Evolution (LTE) band utilized by the first cell group of the wireless network, and the second signal band comprises second LTE band utilized by a different cell group of the wireless network.

8. The wireless device as recited in claim 7, further comprising a connectivity module implemented to detect a transition of the wireless device from the first cell group to the different cell group and in response, cause the second switch to switch between the first signal path and the fifth signal path, and the third switch to switch between the third signal path and the sixth signal path.

9. The wireless device as recited in claim 1, wherein the second switch is operable to switch between the first signal path and the fifth signal path to enable switching between the first signal band and the second signal band for transmission to and primary receive from the first cell group of the wireless network, and the third switch is operable to switch between the third signal path and the sixth signal path to enable the first signal band and the second signal band for diversity receive from the first cell group of the wireless network.

10. An antenna system comprising:
a set of antennas; and
a set of signal paths to support wireless communication for a wireless device, the signal paths including:
a first signal path including a first duplexer, the first signal path being operably connected to a first antenna of the set of antennas and configured to support transmission to and primary receive from a first cell group of a wireless network;

a second signal path including a second duplexer, the second signal path operably connected to a second antenna of the set of antennas and configured to support transmission to and primary receive from a second cell group of the wireless network;

a third signal path including a first filter, the third signal path connected to a third antenna of the set of antennas and configured to support antenna diversity receive from the first cell group of the wireless network;

a fourth signal path including a second filter, the fourth signal path connected to a fourth antenna of the set of antennas and configured to support antenna diversity receive from the second cell group of the wireless network;

a first switch operatively connected to the set of antennas, the second signal path, and the fourth signal path;

a second switch operatively connected to the first switch and the first signal path, the first signal path being configured for a first signal band;

a third switch operatively connected to the first switch and the third signal path, the third signal path being configured for the first signal band;

a fifth signal path operatively connected to the second switch and configured for a second signal band; and a sixth signal path operatively connected to the third switch and configured for the second signal band, wherein the second switch is operable to switch between the first signal path and the fifth signal path to enable wireless communication via the first signal band, and the third switch is operable to switch between the third signal path and the sixth signal path to enable wireless communication via the second signal band.

11. The antenna system as recited in claim 10, wherein the wireless network comprises an E-UTRAN New Radio-Dual Connectivity (EN-DC)-compliant network, the first cell group comprises a Long Term Evolution (LTE) portion of the wireless network, and the second cell group comprises a 5G New Radio (NR) portion of the wireless network.

12. The antenna system as recited in claim 10, wherein at least one of the first switch, the second switch, or the third switch is operable to disconnect the first signal path from the first antenna, and to connect the first signal path to a different antenna of the set of antennas as part of an antenna diversity implementation.

13. The antenna system as recited in claim 12, further comprising a connectivity module implemented to cause the at least one of the first switch, the second switch, or the third switch to disconnect the first signal path from the first antenna, and to connect the first signal path to the different antenna of the set of antennas in response to detecting one or more of a reduction in signal quality at the first antenna or a physical obstruction of the first antenna.

14. The antenna system as recited in claim 10, wherein the first signal band comprises a first Long Term Evolution (LTE) band utilized by the first cell group of the wireless network, and the second signal band comprises second LTE band utilized by a different cell group of the wireless network.

15. A wireless device comprising:
a set of antennas; and
a set of signal paths to support wireless communication for the wireless device, the signal paths including:
   a first signal path including a first duplexer, the first signal path being operably connected to a first antenna of the set of antennas and configured to support wireless primary receive from a first cell group of a wireless network, and diversity receive from a second cell group of the wireless network;
   a second signal path including a second duplexer, the second signal path operably connected to a second antenna of the set of antennas and configured to support primary receive from the second cell group and diversity receive from the first cell group;
   a third signal path including a first filter, the third signal path connected to a third antenna of the set of antennas and configured to support transmission to the first cell group;
   a fourth signal path including a second filter, the fourth signal path connected to a fourth antenna of the set of antennas and configured to support transmission to the second cell group;
   a first switch operatively connected to the set of antennas, the second signal path, and the fourth signal path;
   a second switch operatively connected to the first switch and the first signal path, the first signal path being configured for a first signal band;
   a third switch operatively connected to the first switch and the third signal path, the third signal path being configured for the first signal band;
   a fifth signal path operatively connected to the second switch and configured for a second signal band; and
   a sixth signal path operatively connected to the third switch and configured for the second signal band,
   wherein the second switch is operable to switch between the first signal path and the fifth signal path to enable wireless communication via the first signal band, and the third switch is operable to switch between the third signal path and the sixth signal path to enable wireless communication via the second signal band.

16. The wireless device as recited in claim 15, wherein the wireless network comprises an E-UTRAN New Radio-Dual Connectivity (EN-DC)-compliant network, the first cell group comprises a Long Term Evolution (LTE) portion of the wireless network, and the second cell group comprises a 5G New Radio (NR) portion of the wireless network.

17. The wireless device as recited in claim 15, wherein at least one of the first switch, the second switch, or the third switch is operable to disconnect the first signal path from the first antenna, and to connect the first signal path to a different antenna of the set of antennas as part of an antenna diversity implementation.

18. The wireless device as recited in claim 17, further comprising a connectivity module implemented to cause at least one of the first switch, the second switch, or the third switch to disconnect the first signal path from the first antenna, and to connect the first signal path to the different antenna of the set of antennas in response to detecting one or more of a reduction in signal quality at the first antenna or a physical obstruction of the first antenna.

19. The wireless device as recited in claim 15, wherein the first signal band comprises a first Long Term Evolution (LTE) band utilized by the first cell group of the wireless network, and the second signal band comprises second LTE band utilized by a different cell group of the wireless network.

20. The wireless device as recited in claim 19, further comprising a connectivity module implemented to detect a transition of the wireless device from the first cell group to the different cell group and in response, cause the second switch to switch between the first signal path and the fifth signal path, and the third switch to switch between the third signal path and the sixth signal path.

* * * * *